(12) United States Patent
Scrivano

(10) Patent No.: US 11,093,299 B2
(45) Date of Patent: Aug. 17, 2021

(54) UID AND GID SHIFTING FOR CONTAINERS IN USER NAMESPACES

(71) Applicant: Red Hat, Inc., Raleigh, NC (US)

(72) Inventor: Giuseppe Scrivano, Milan (IT)

(73) Assignee: Red Hat, Inc., Raleigh, NC (US)

( * ) Notice: Subject to any disclaimer, the term of this patent is extended or adjusted under 35 U.S.C. 154(b) by 127 days.

(21) Appl. No.: 16/393,811

(22) Filed: Apr. 24, 2019

(65) Prior Publication Data

US 2020/0341821 A1 Oct. 29, 2020

(51) Int. Cl.
*G06F 9/46* (2006.01)
*G06F 9/52* (2006.01)
*G06F 12/02* (2006.01)

(52) U.S. Cl.
CPC ............ *G06F 9/52* (2013.01); *G06F 12/0223* (2013.01)

(58) Field of Classification Search
CPC ............................... G06F 9/52; G06F 12/0223
See application file for complete search history.

(56) References Cited

U.S. PATENT DOCUMENTS

| 2017/0373940 A1 | 12/2017 | Shahab et al. | |
| 2018/0083915 A1* | 3/2018 | Medam ............. | H04L 29/12018 |
| 2018/0137296 A1 | 5/2018 | Cahana et al. | |
| 2018/0247064 A1* | 8/2018 | Aronovich ......... | G06F 21/6209 |
| 2020/0117743 A1* | 4/2020 | Shilimkar .......... | G06F 9/45558 |

OTHER PUBLICATIONS

King, "The Route to Rootless Containers", Cloud Foundry, located at https://www.cloudfoundry.org/blog/route-rootless-containers/, Sep. 20, 2017, 13 pages.
"Investigating User Namespaces", Issue 986, located at https://github.com/rkt/rkt/issues/986, GitHub, Inc. Jun. 3, 2015, 7 pages.
"Dynamic Users with Systemd", located at http://0pointer.net/blog/dynamic-users-with-systemd.html , GitHub, Inc. Oct. 6, 2017, 14 pages.
"Use Linux User Namespaces to Fix Permissions in Docker Volumes", DockerUnix, located at https://www.jujens.eu/posts/en/2017/Jul/02/docker-userns-remap/, Jul. 2, 2017, 6 pages.
Cyphar, "Moving to Rootless-Containers", Issue 16, located at https://github.com/containers/fuse-overlayfs/issues/16, GitHub, Inc., Sep. 3, 2018, 2 pages.

* cited by examiner

*Primary Examiner* — Wissam Rashid
(74) *Attorney, Agent, or Firm* — Womble Bond Dickinson (US) LLP

(57) ABSTRACT

A request to access an image stored by a host operating system (OS) maybe received from a process running in a container. The container may run a namespace including a plurality of namespace user identifiers (UIDs). A host UID corresponding to the namespace UID of the process may be synchronized with a host UID of an owner of the image based on configuration data of the namespace. In this way, multiple containers running namespaces may access a read only image file without requiring the image file to be copied for each container, thus preserving memory resources.

20 Claims, 6 Drawing Sheets

UID AND GID SHIFTING FOR CONTAINERS IN USER NAMESPACES

TECHNICAL FIELD

Aspects of the present disclosure relate to containerized applications, and more particularly, user namespaces in containers.

BACKGROUND

Containers are active components executing on an operating system that provide an environment for applications to run, while being isolated from the rest of the system. Multiple containers may execute on a single operating system kernel and share the resources of the hardware the operating system is running on. All of the files, libraries and dependencies necessary to run applications in a container are provided by images. Images define the runtime environment, as well as the packages and utilities necessary for a containerized application to run. The images for running a containerized application may be stored on a container host executing on the operating system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, containers are active components executing on an operating system that provide an environment for applications to run, while being isolated from the rest of the system. The operating system may provide for process isolation by creating separate namespaces for containers. Namespaces enable the creation of an abstraction of a particular global system resource and make it appear as a separated instance to processes within a namespace. Thus, several containers can use the same resource simultaneously without creating a conflict. One type of namespace is a user namespace. User namespaces allow a developer to specify a range of host user identities (UIDs) and group user identities (GIDs) that are dedicated to the container, and mapped to namespace UIDs within the container. Thus, a process can have full root privileges for operations inside the container, while simultaneously being unprivileged for operations outside the container.

However, the use of user namespaces can prohibit the sharing of read-only images. A container created without a namespace may access a read-only image as it is, as there is no ownership issue since the UIDs of the host correspond to those of the container. However, a container running with a namespace will include UIDs different to those in the host. For example, an image owned by the root user in the host (host UID=0) will not be accessible by a container having a user namespace with namespace UID=0 mapped to host UID=1001 in the host. Thus, it is necessary to create a copy of the image for each user namespace with an ownership UID corresponding to the host UID that is mapped to the root UID for that namespace. This may result in multiple copies of the image being stored on the host, with the only difference between the copies being the UID/GID for every copy is different. Large amounts of storage space are thus consumed as memory must be allocated for a copy each and every time a process within the namespace wishes to access the image.

Aspects of the present disclosure address the above-noted and other deficiencies by using a processing logic to temporarily synchronize the host UID of the owner of an image to a host UID corresponding to the namespace UID of a process attempting to access the image. The processing logic may analyze configuration data of the namespace to determine the host UID corresponding to the namespace UID of the process attempting to access the image, and present the host UID of the owner of the image to the kernel of the host operating system as the host UID corresponding to the namespace UID of the process attempting to access the image. In this way, the kernel may see that the host UID of the owner of the image matches the host UID corresponding to the namespace UID of the process attempting to access the image, thereby allowing the container (and any processes therein) to access the image file without a copy being made.

Figure 1A:
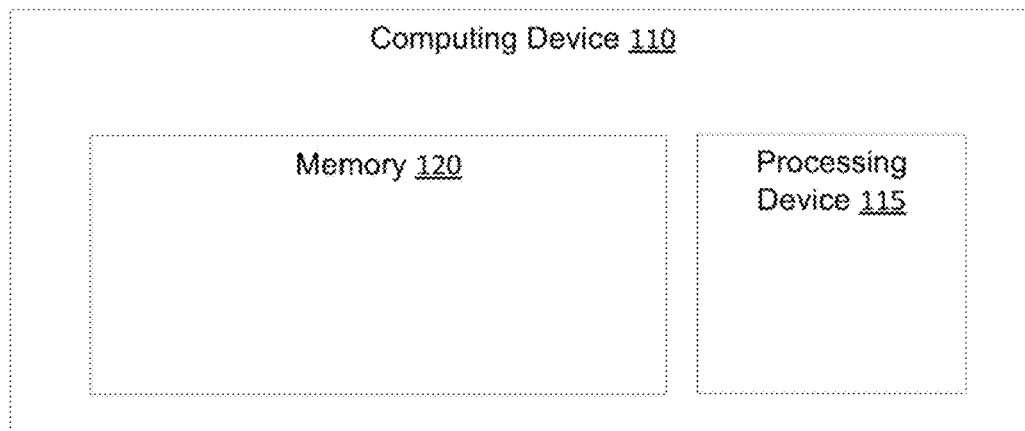
FIG. 1A is a block diagram that illustrates an example system, in accordance with some embodiments of the present disclosure.

FIG. 1A is a block diagram that illustrates an example computing system 100, in accordance with some embodiments of the present disclosure. As illustrated in FIG. 1A, the system 100 includes computing device 110. Computing device 110 may include memory 120, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Computing device 110 may also include hardware such as processing device 115 (e.g., processors, central processing units (CPUs), memory (e.g., random access memory (RAM), storage devices (e.g., hard-disk drive (IDD), solid-state drive (SSD), etc.), and other hardware devices (e.g., sound card, video card, etc.). Computing device 110 may comprise any suitable type of computing device or machine that has a programmable processor including, for example, server computers, desktop computers, laptop computers, tablet computers, smartphones, set-top boxes, etc. In some examples, computing device 110 may comprise a single machine or may include multiple interconnected machines (e.g., multiple server configured in a cluster). Computing device 110 may execute or include an operating system (OS)(not shown in FIG. 1A), as discussed in more detail below. The OS of computing device 110 may manage the execution of other components (e.g., software, applications, etc.) and may manage access to the hardware (e.g., processors, memory, storage devices etc.) of the computing device. In some embodiments, computing device 110 may be in a client/server relationship with other computing devices (not shown), with computing device 110 acting as a server and another computing device acting as a client.

Figure 1B:
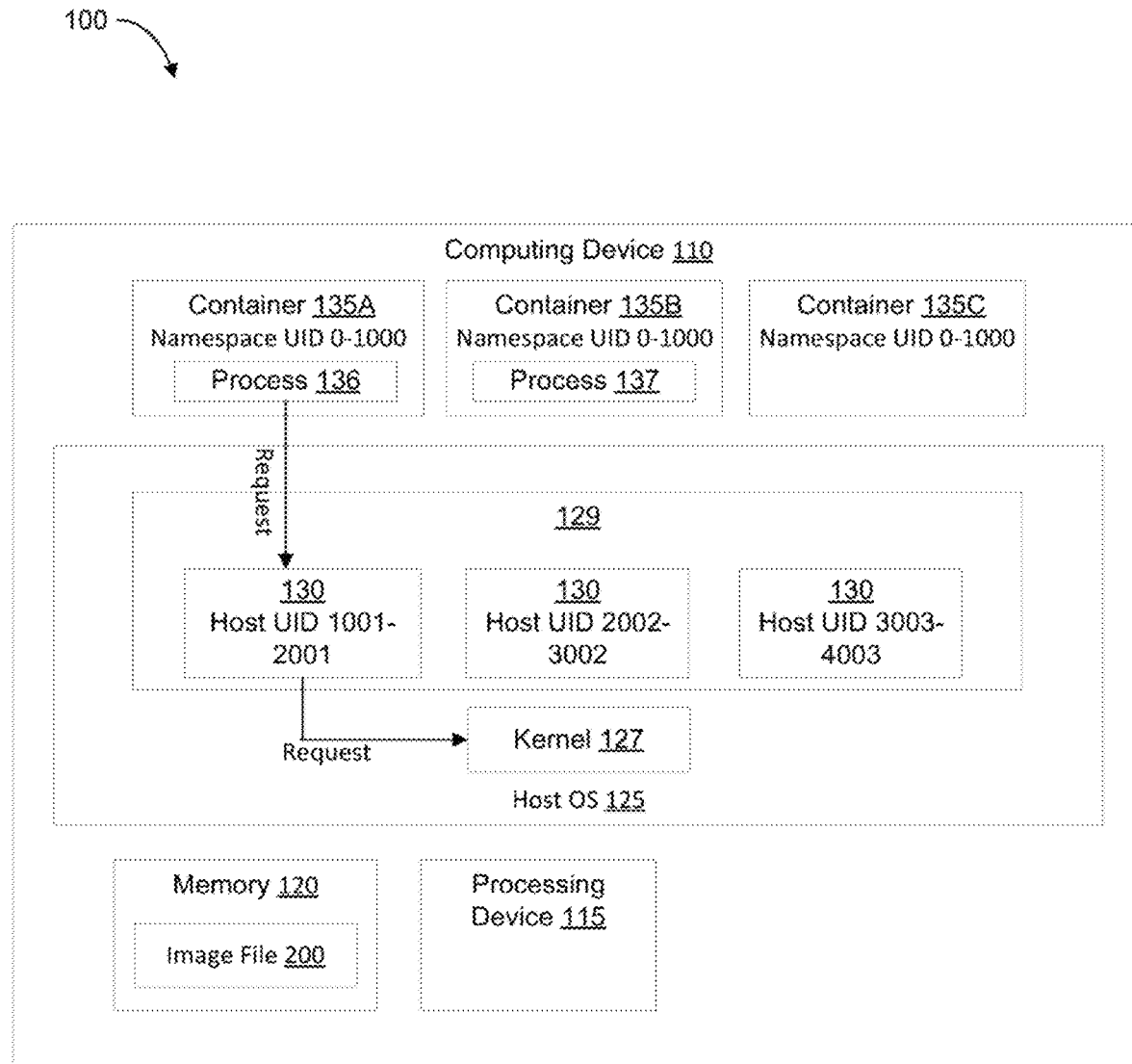
FIG. 1B is a block diagram that illustrates an example system, in accordance with some embodiments of the present disclosure.

FIG. 1B illustrates computing device 110 in accordance with some embodiments of the present disclosure. Computing device 110 may implement, using memory 120, a host operating system 125 (hereinafter host OS 125), such as Redhati® Linux™. Host OS 125 may include a kernel 127, which manages lower level functions such as memory management, file system, network and process scheduling. Host OS 125 may also implement a container host module 129 (hereinafter container host 129), such as Redhat™ OpenShift™, which may function to create and utilize containers. Container host 129 may provide an image-based deployment module for creating containers and may store one or more image files for creating container instances. Each image file may include a series of layers, which may be combined into a single image as discussed in further detail herein. A layer is created when the image changes. For example, whenever a user specifies a command, such as "run" or "copy," a new layer may be created.

Container host module 129 may include a storage driver 130, such as OverlayFS, to manage the contents of an image file including the read only and writable layers of the image file. The storage driver 130 may include a type of union file system which allows a developer to overlay one file system on top of another. Changes may be recorded in the upper file system, while the lower file system (base image) remains unmodified. In this way, multiple containers may share a file-system image where the base image is read-only media. Container host 129 may include a number of host UIDs (e.g., 0-1000) including host UID 0 (corresponding to the host root user), which may be assigned as the owner of an image file (e.g., image file 200 illustrated in FIG. 2). The storage driver 130 may have built-in support for dynamic UID/GID mapping and may instruct container host 129 to store images (e.g., image file 200 illustrated in FIG. 2) in memory 120 in a remapped format for a particular user namespace. When the storage driver 129 creates a user namespace, it may generate a number of namespace UIDs (e.g., namespace UIDs 0-1000) and a one to one mapping of the namespace UIDs to a range of host UIDs. The storage drive 129 may also generate configuration data indicating the mapping of the namespace UIDs to host UIDs. The storage driver 130 may have characteristics of a file system in user space (FUSE) in that it may allow non-privileged users to create their own file systems without editing the code of kernel 127.

Figure 2:
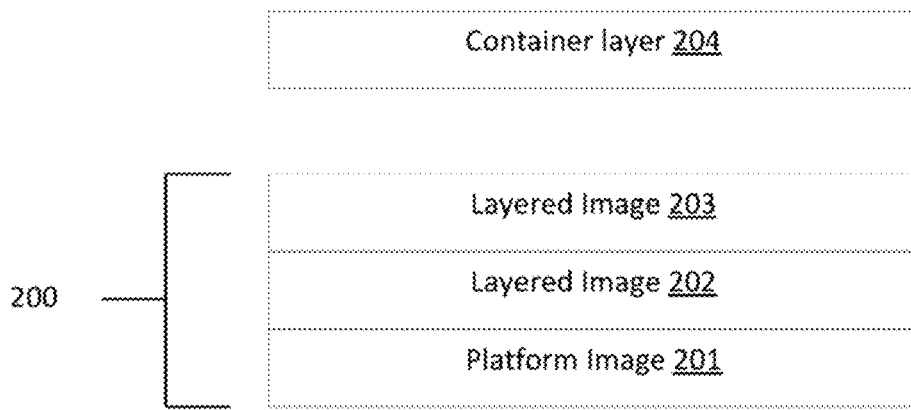
FIG. 2 is a diagram illustrating the layers of an image file, in accordance with some embodiments of the present disclosure.

FIG. 2 illustrates an example image file 200. Image file 200 may include a platform image 201 as well as layered images 202 and 203. Platform image 201 may define the runtime environment as well as the packages and utilities necessary for a containerized application to run. The platform image 201 may be read-only, thus any changes may be implemented in subsequent layers. Layered image 202 and 203 may each be static snapshots of the containers' configuration. Each of layered image 202 and 203 are read-only layers, that are never modified. Thus, all changes are made in the container layer 204 and may be saved by creating a new layered image. The image file 200 may be stored by the container host module 129 of FIG. 1B, where only the host root user (host UID 0) may access it. Image file 200 may be shared by multiple containers. When container host module 129 creates a new container, it may add a new writable layer on top of the underlying layers. This new writable layer is illustrated as the container layer 204 in FIG. 2. All changes made to the running container, such as writing new files, modifying existing files, and deleting files, are written to this writable container layer 204. When the container is deleted, the writable container layer 204 is also deleted. However, the underlying image file 200 remains unchanged.

Referring back to FIG. 1B, containers 135A-C may run atop the host OS 125 after being instantiated by container host 129. Although illustrated as having only containers 135A-C, any appropriate number of containers may be included. As discussed herein, each container may run an application including all of the various processes associated with the application. If the containers 135A-C do not utilize user namespaces, then they may share and access the image file 200 as normal. However, as discussed herein, each container 135A-C may be configured with a user namespace wherein each user namespace may have its own range of namespace UIDs 0-1000. The range of namespace UIDs for each container maybe mapped to a range of host UIDs. In some embodiments, the range of host UIDs for each container may represent the namespace UIDs of the container from the perspective of the kernel 127. For example, if process 136 in container 135A has namespace UID 0, kernel 127 may see process 136 as having host UID 1001, not namespace UID 0. Each user namespace may include configuration data that specifies the range of host UIDs that the namespace UIDs of the container are mapped to. As shown in FIG. 1B, container 135A may include namespace UIDs 0-1000, which are mapped to host UIDs 1001-2001 respectively. Container 135B may include namespace UIDs 0-1000 which may be mapped to host UIDs 2002-3002 respectively. Similarly, container 135C may include namespace UIDs 0-1000 which may be mapped to host UIDs 3003-4003 respectively. Thus, the root user (UID 0) of container 135A may correspond to host UID 1001, the root user of container 135B may correspond to host UID 2002, and the root user of container 135C may correspond to host UID 3003. It should be noted that the host UIDs 0-1000 are not mapped to any namespace UIDs for any containers 135A-C. Because of this mapping, containers 135A-C may no longer be able to access the read-only portions of image file 200 as the host UID corresponding to the namespace UID of a process attempting to access image file 200 (indicating the way the kernel sees the process in terms of UID) in each container does not match the host UID 0 of the host root user (e.g., the owner of the image file 200). In some embodiments, the namespace UID of the process may correspond to the UID of the root user of a namespace (e.g., namespace UID=0). Although illustrated as having host UIDs 0-4003 and namespace UIDs 0-1000 for each container 135A-C, any appropriate number of host and namespace UIDs may be utilized. Thus, when process 136 in container 135A (running a namespace) wishes to access image file 200, the storage driver 130 may synchronize a host UID corresponding to the namespace UID associated with the process 136 with the host UID corresponding to the owner of the image file 200 as discussed in further detail below. The above discussion applies similarly to GIDs of the containers 135A-C.

When a process 136 from container 135A wants to access image file 200, storage drive 130 may synchronize the host UID that the namespace UID of the process 136 is mapped to with the host UID (e.g., host UID 0) of the owner of the image file 200 (host root user). More specifically, upon receiving the request for image file 200, storage drive 130 may examine the namespace configuration data of container 135A at run time, and determine the host UID that the namespace UID of the process 136 is mapped to. For example, process 136 may have namespace UID 0 (corresponding to the root user of container 135A). It should be noted that use of the root user namespace UID 0 is by example only, and process 137 is not limited to the root user namespace UID 0. In this case, namespace UID 0 maps to host UID 1001. In this example, the process 136 may present to the kernel 127 as having host UID 1001. Stated differently, kernel 127 sees process 136 as having host UID 1001, not namespace UID 0. Although the image file 200 may have ownership by host UID 0 (corresponding to the host root user), the storage drive 130 may instruct the container host 129 to present the ownership of the image file 200 to the kernel 127 as host UID 1001 (referencing the host UID that namespace UID 0 maps to, or corresponds to). Because the kernel 127 now sees that the host UID of the requesting process and the host UID of the owner of the image file 200 are matched, kernel 127 may grant process 136 access to the image file 200. Because storage drive 130 may execute in user space, it does not require host OS root user privileges. It should be noted that a similar process may be used to synchronize a host GID corresponding to a namespace GID of the process 136 with the host GID of the owner of the image file 200.

Similarly, if a process 137 from container 135B wants to access image file 200, storage drive 130 may examine the configuration data of container 135B at run time and determine the host UID that the namespace UID of the process 137 is mapped to (e.g., if the process 137 has namespace UID 0, namespace UID 0 maps to kernel UID 2002). In this example, the process 137 may present to the kernel 127 as host UID 2001. It should be noted that use of the root user namespace UID 0 is by example only, and process 137 is not limited to the root user namespace UID 0. Although the image file 200 may have ownership by host UID 0 (corresponding to the host root user), the storage drive 130 may instruct the container host 129 to present the ownership of the image file 200 to the kernel 127 as host UID 2002. Because the kernel 127 now sees that the host UID of the requesting process 137 and the host UID of the owner of the image file are matched, kernel 127 may grant process 137 access to the image file 200. In this way, storage driver 130 may only store one copy of image file 200. A number of containers may access image file 200, and storage driver 130 may allocate memory from memory 120 for access of the image file 200 only once. Upon completing the access of the image file 200, the storage driver 130 may revert the host UID of the owner of the image file to its original value.

Figure 3:
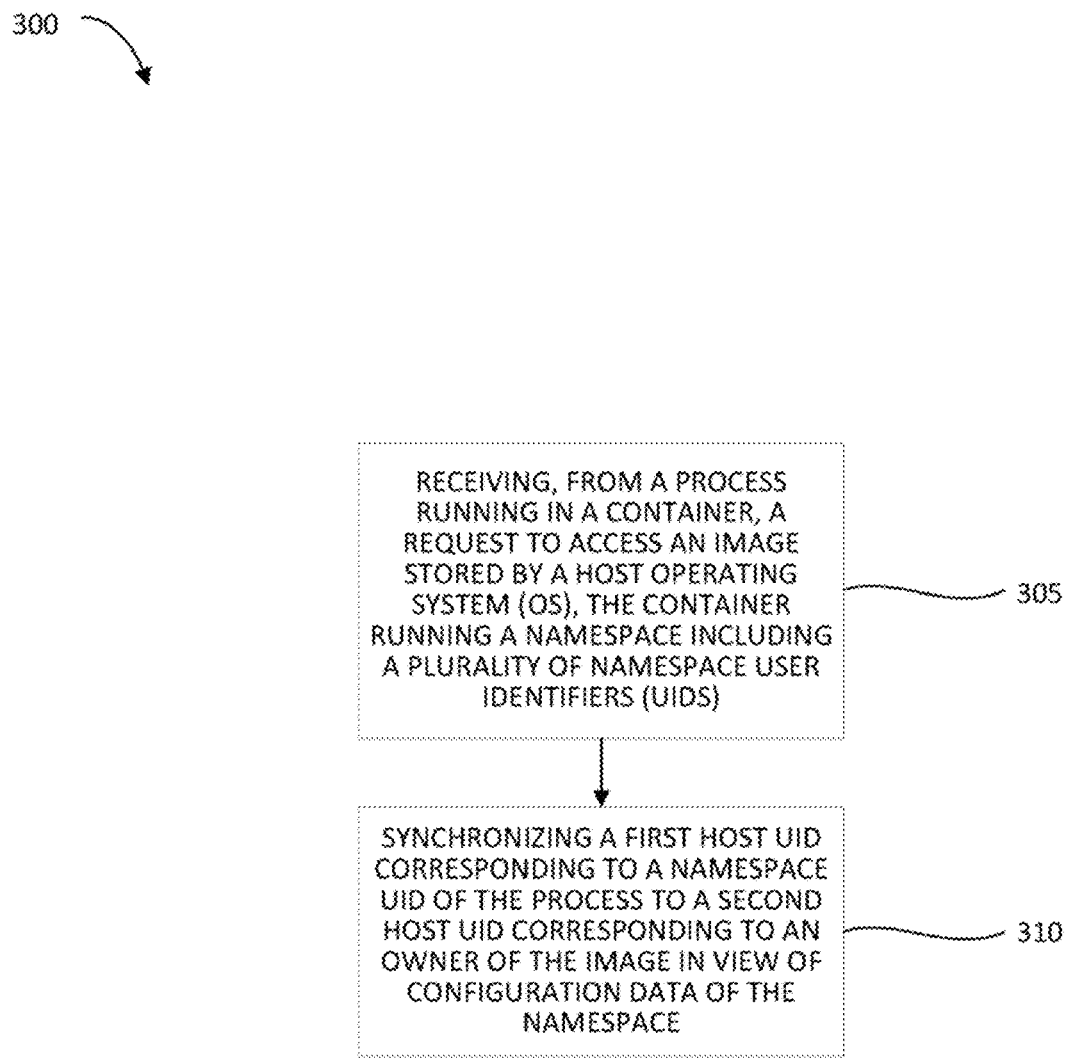
FIG. 3 is a flow diagram of a method of providing access to an image file for containers running a user namespace, in accordance with some embodiments of the present disclosure.

FIG. 3 is a flow diagram illustrating a method 300 for providing access to an image file for one or more containers running a namespace without generating more than one copy of the image file. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a processing device (e.g., processing device 115 illustrated in FIGS. 1A and 1B).

At block 305, the processing device 115 may receive from a process 136 running in a container 135A, a request to access an image stored by a host operating system (OS) 125. The container 135A may be running a namespace (not shown) including a plurality of namespace user identifiers (UIDs) 0-1000. At block 310, the processing device 115 may synchronize a host UID corresponding to the namespace UID of the process 136 to a host UID of an owner of the image based on configuration data of the namespace. More specifically, when a process 136 from container 135A wants to access image file 200, processing device 115 may examine the configuration data of container 135A at run time, and determine the host UID that the namespace UID of the process 136 is mapped to. For example, process 136 may have namespace UID 0 (corresponding to the root user of container 135A), in this case, namespace UID 0 maps to host UID 1001. In this example, processing device 115 may present the process 136 to the kernel 127 as having host UID 1001. Although the image file 200 may have ownership by host UID 0 (corresponding to the host root user), the processing device 115 may instruct the container host 129 to present the ownership of the image file 200 to the kernel 127 as host UID 1001 (referencing the host UID that namespace UID 0 maps to). Because the kernel 127 now sees that the host UID of the requesting process and the host UID of the owner of the image file 200 are matched, kernel 127 may grant process 136 access to the image file 200. Because storage drive 130 may execute in user space, it does not require host OS root user privileges.

Figure 4:
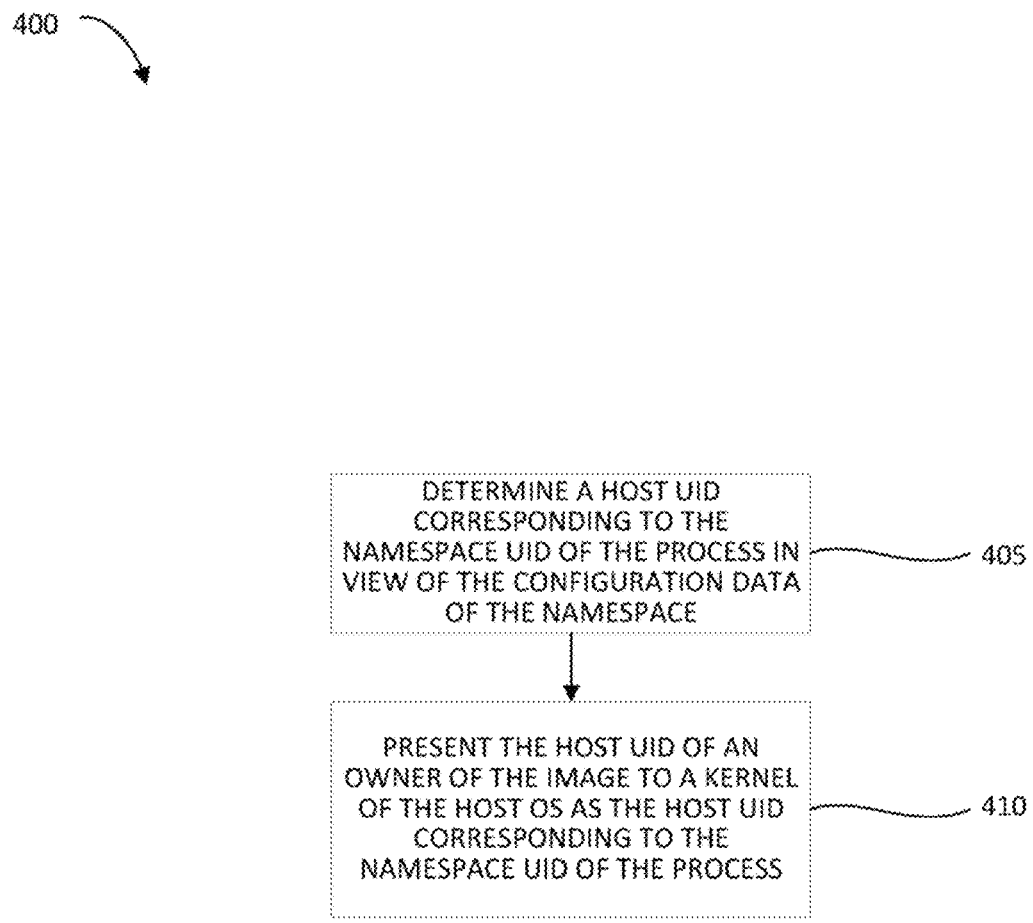
FIG. 4 is a flow diagram of a method of synchronizing host UIDs, in accordance with some embodiments of the present disclosure.

FIG. 4 is a flow diagram illustrating a method 400 for synchronizing a host UID corresponding to the namespace UID of the process 136 to a host UID of an owner of the image. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a processing device (e.g., processing device device 115 illustrated in FIGS. 1A and 1B).

At block 405, processing device 115 may determine a host UID corresponding to the namespace UID of the process 136 in view of the configuration data of the namespace. In this case, processing device may determine that process 136 has been assigned namespace UID 0 which corresponds to host UID 1001. At block 410, processing device 115 may present the host UID of an owner of the image to a kernel of the host OS as the host UID corresponding to the namespace UID of the process. More specifically, the processing device 115 may instruct the container host 129 to present the ownership of the image file 200 to the kernel 127 as host UID 1001 (referencing the host UID that namespace UID 0 of the process 136 maps to).

Figure 5:
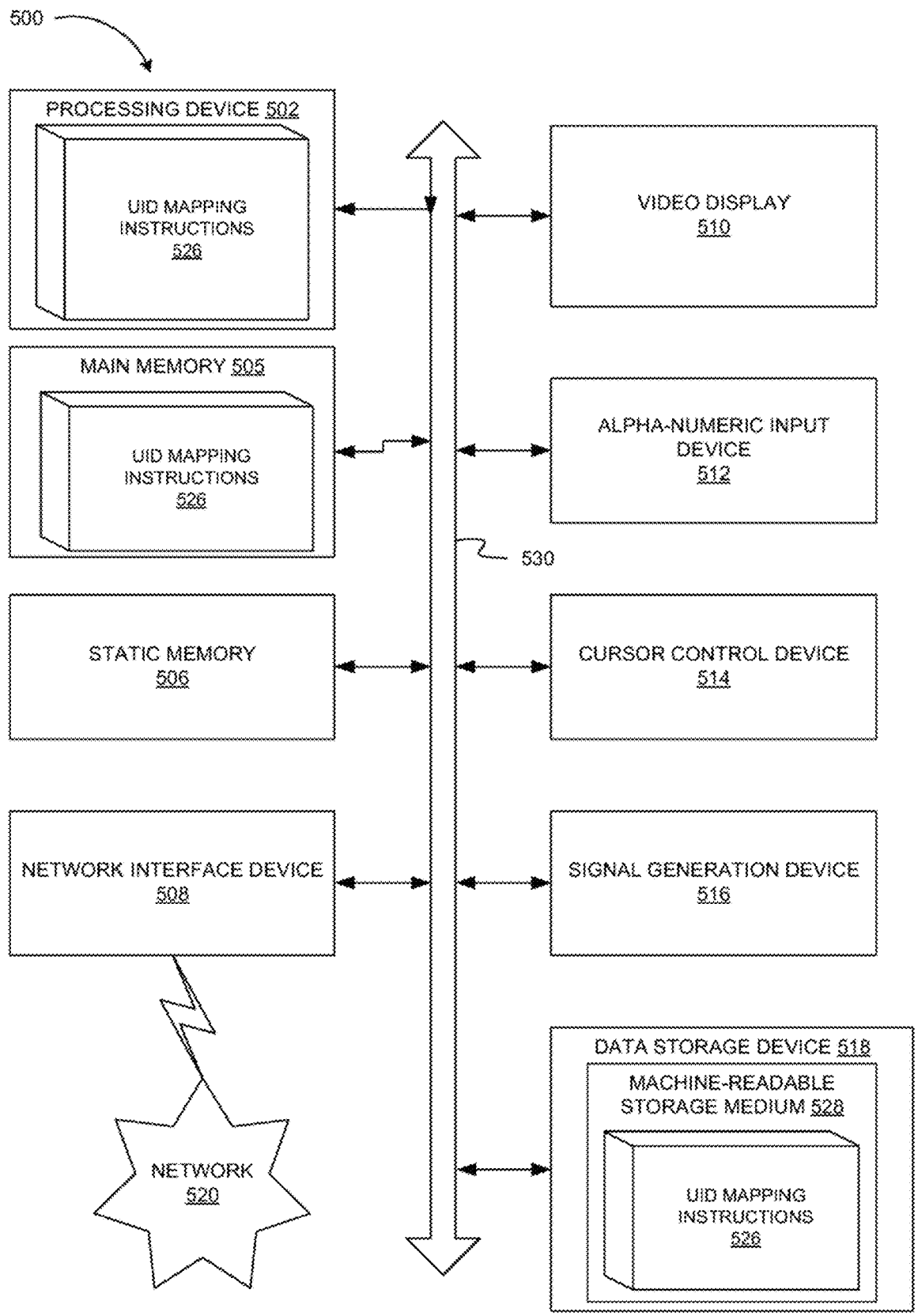
FIG. 5 is a block diagram that illustrates an example of a computing device in accordance with some aspects of the present disclosure.

FIG. 5 illustrates a diagrammatic representation of a machine in the example form of a computer system 500 within which a set of instructions, for causing the machine to perform any one or more of the methodologies discussed herein for remapping UIDs for containers running a user namespace. More specifically, the machine may receive, from a process running in a container, a request to access a layer stored in a host operating system (OS). The container may run a namespace including a plurality of namespace UIDs. The machine may map a namespace UID of the requesting process to a host UID of an owner of the layer based on configuration data of the namespace.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as DSL server 10 configured to perform multi-level task debugging.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute UID remapping instructions 526, for performing the operations and steps discussed herein.

The data storage device 518 may include a machine-readable storage medium 528, on which is stored one or more sets of UID remapping instructions 526 (e.g., software) embodying any one or more of the methodologies of functions described herein, including instructions to cause the processing device 502 to execute the functionality of computing device 110 shown in FIG. 1B. The UID remapping instructions 526 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   receiving, from a process running in a container, a request to access an image file stored by a host operating system (OS), the container running a namespace including a plurality of namespace user identifiers (UIDs); and
   synchronizing, by a processing device, a first host UID corresponding to a namespace UID of the process to a second host UID corresponding to an owner of the image file in view of configuration data of the namespace to present the second host UID to a kernel of the host OS as the first host UID.

2. The method of claim 1, wherein the configuration data of the namespace includes a mapping from each of the plurality of namespace UIDs to a corresponding host UID.

3. The method of claim 2, further comprising:
   determining the first host UID in view of the configuration data of the namespace.

4. The method of claim 1, wherein the synchronizing is performed at a run time of the container.

5. The method of claim 1, wherein the synchronizing is performed using a storage driver in user space without host OS root user privileges.

6. The method of claim 1, wherein:
   memory for a plurality of containers to access the image is allocated once; and
   one copy of the image is stored for access by the plurality of containers.

7. The method of claim 1, wherein the namespace UID of the process corresponds to a namespace UID of a root user of the container.

8. A system comprising:
   a memory to store an image file;
   a processing device to:
   receive, from a process running in a container, a request to access the image file stored by a host operating system (OS), the container running a namespace including a plurality of namespace user identifiers (UIDs); and
   synchronize a first host UID corresponding to a namespace UID of the process to a second host UID corresponding to an owner of the image file in view of configuration data of the namespace to present the second host UID to a kernel of the host OS as the first host UID.

9. The system of claim 8, wherein the configuration data of the namespace includes a mapping of each the plurality of namespace UIDs to a corresponding host UID.

10. The system of claim 9, wherein the processing device is further to:
    determine the first host UID in view of the configuration data of the namespace.

11. The system of claim 8, wherein the processing device performs the synchronizing at a run time of the container.

12. The system of claim 8, wherein the processing device performs the synchronizing using a storage driver in user space without host OS root user privileges.

13. The system of claim 8, wherein the processing device is further to:
    allocate memory for a plurality of containers to access the image once; and
    store one copy of the image for access by the plurality of containers in the memory.

14. The system of claim 8, wherein the namespace UID of the process corresponds to a namespace UID of a root user of the container.

15. A non-transitory computer-readable storage medium including instructions that, when executed by a processing device, cause the processing device to:
    receive, from a process running in a container, a request to access an image file stored by a host operating system (OS), the container running a namespace including a plurality of namespace user identifiers (UIDs); and
    synchronize a first host UID corresponding to a namespace UID of the process to a second host UID corresponding to an owner of the image file in view of configuration data of the namespace to present the second host UID to a kernel of the host OS as the first host UID.

16. The non-transitory computer-readable storage medium of claim 15, wherein the configuration data of the namespace includes a mapping of each the plurality of namespace UIDs to a corresponding host UID.

17. The non-transitory computer-readable storage medium of claim 16, wherein the processing device is further to:
    determine the first host UID in view of the configuration data of the namespace.

18. The non-transitory computer-readable storage medium of claim 15, wherein the processing device performs the synchronizing at a run time of the container.

19. The non-transitory computer-readable storage medium of claim 15, wherein the processing device performs the synchronizing using a storage driver in user space without host OS root user privileges.

20. The non-transitory computer-readable storage medium of claim 15, wherein the processing device is further to:
 allocate memory for a plurality of containers to access the image once; and
 store one copy of the image for access by the plurality of containers in the memory.

* * * * *